US008660573B2

(12) United States Patent
Zhu et al.

(10) Patent No.: US 8,660,573 B2
(45) Date of Patent: Feb. 25, 2014

(54) LOCATION SERVICE REQUESTS THROTTLING

(75) Inventors: Yinjun Zhu, Sammamish, WA (US); Gordon John Hines, Kirkland, WA (US); Victor Burton, Bellevue, WA (US); Hsin-Chih Liao, Mill Creek, WA (US)

(73) Assignee: TeleCommunications Systems, Inc., Annapolis, MD (US)

( * ) Notice: Subject to any disclaimer, the term of this patent is extended or adjusted under 35 U.S.C. 154(b) by 7 days.

(21) Appl. No.: 11/244,223

(22) Filed: Oct. 6, 2005

(65) Prior Publication Data

US 2007/0021125 A1    Jan. 25, 2007

Related U.S. Application Data

(60) Provisional application No. 60/700,345, filed on Jul. 19, 2005.

(51) Int. Cl.
*H04W 24/00* (2009.01)

(52) U.S. Cl.
USPC .............. 455/456.1; 455/456.2; 455/456.3; 455/456.5; 455/456.6; 455/453

(58) Field of Classification Search
USPC .......... 455/404.1, 404.2, 412.1, 412.2, 414.1, 455/414.2, 456.1–456.6, 466, 556.2, 453, 455/457; 379/201.06, 201.13, 207.15; 709/203, 232–235
See application file for complete search history.

(56) References Cited

U.S. PATENT DOCUMENTS

| 1,103,073 A | 7/1914 | O'Connell |
| 4,445,118 A | 4/1984 | Taylor |
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |

(Continued)

FOREIGN PATENT DOCUMENTS

| WO | WO9921380 | 4/1999 |
| WO | PCT/US99/28848 | 12/1999 |

(Continued)

OTHER PUBLICATIONS

U.S. Appl. No. 09/539,495, filed Mar. 2000, Abrol.

(Continued)

*Primary Examiner* — Olumide T Ajibade Akonai (57) ABSTRACT

A technique to allow a server such as a location server to throttle concurrent or closely timed location requests for the position of a given wireless device such that within a certain time period preferably only one location request will be initiated to the positioning engine and the remaining closely-timed location requests will be buffered or cached. When a position for the given wireless device is returned per the outstanding location request, then the retrieved position will be used to respond to each of the buffered location requests. Thus, a plurality of location requests are satisfied with a single request to the positioning engine. By optimizing the use of cached position requests, throttling of location requests per the invention reduces network traffic significantly, increases the efficiency of a positioning server (therefore reducing business cost), and provides for an improved grade or quality of location based services in general.

11 Claims, 4 Drawing Sheets

(56) References Cited

U.S. PATENT DOCUMENTS

| | | |
|---|---|---|
| 4,952,928 A | 8/1990 | Carroll |
| 4,972,484 A | 11/1990 | Theile et al. |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,265,630 A | 11/1993 | Hartmann |
| 5,266,944 A | 11/1993 | Caroll |
| 5,269,570 A | 12/1993 | Nunley |
| 5,283,570 A | 2/1994 | DeLucca |
| 5,289,527 A | 2/1994 | Tiedemann, Jr. |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults et al. |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Caroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,432,841 A | 7/1995 | Rimer |
| 5,434,789 A | 7/1995 | Frakar |
| 5,454,024 A | 9/1995 | Lebowitz |
| 5,461,390 A | 10/1995 | Hosher |
| 5,470,233 A | 11/1995 | Frutcherman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff et al. |
| 5,530,914 A | 6/1996 | McPheters |
| 5,532,690 A | 7/1996 | Hertel |
| 5,535,435 A | 7/1996 | Balzano |
| 5,539,395 A | 7/1996 | Buss |
| 5,539,398 A | 7/1996 | Hall |
| 5,539,829 A | 7/1996 | Lokhoff et al. |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Astrom |
| 5,587,201 A | 12/1996 | Rho et al. |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff et al. |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van De Kerkhof et al. |
| 5,689,245 A | 11/1997 | Noreen |
| 5,699,053 A | 12/1997 | Jonsson |
| 5,704,029 A | 12/1997 | Wright, Jr. |
| 5,717,688 A | 2/1998 | Belanger et al. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Muntully |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,835,907 A | 11/1998 | Newman |
| 5,841,396 A | 11/1998 | Kransner |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard et al. |
| 5,930,250 A | 7/1999 | Klok |
| 5,930,701 A | 7/1999 | Skog |
| 5,943,399 A | 8/1999 | Bannister |
| 5,945,944 A | 8/1999 | Kraser |
| 5,946,629 A | 8/1999 | Sawyer |
| 5,946,630 A | 8/1999 | Willara |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao et al. |
| 5,983,109 A | 11/1999 | Montoya |
| 5,987,323 A | 11/1999 | Huotari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithil |
| 6,032,051 A | 2/2000 | Hall |
| 6,035,025 A | 3/2000 | Hanson |

(56) References Cited

U.S. PATENT DOCUMENTS

| | | |
|---|---|---|
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordham |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal et al. |
| 6,128,664 A | 10/2000 | Yanagidate et al. |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos et al. |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,185,427 B1 | 2/2001 | Krasner |
| 6,188,354 B1 | 2/2001 | Soliman et al. |
| 6,188,752 B1 | 2/2001 | Lesly |
| 6,188,909 B1 | 2/2001 | Alanara |
| 6,189,089 B1 | 2/2001 | Walker et al. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,783 B1 | 6/2001 | Crone et al. |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | DeZonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat et al. |
| 6,317,594 B1 | 11/2001 | Gossman |
| 6,321,091 B1 | 11/2001 | Holand |
| 6,321,092 B1 | 11/2001 | Fitch |
| 6,321,250 B1 | 11/2001 | Knape |
| 6,321,257 B1 | 11/2001 | Kotola |
| 6,324,542 B1 | 11/2001 | Wright, Jr. |
| 6,327,473 B1 | 12/2001 | Soliman et al. |
| 6,327,479 B1 | 12/2001 | Mikkola |
| 6,330,454 B1 | 12/2001 | Verdonk |
| 6,333,919 B2 | 12/2001 | Gafney |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,377,810 B1 | 4/2002 | Geiger |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,464 B1 | 2/2003 | Santhoff |
| 6,519,466 B2 | 2/2003 | Pande et al. |
| 6,522,682 B1 | 2/2003 | Kohli et al. |
| 6,526,026 B1 | 2/2003 | Menon |
| 6,529,490 B1 | 3/2003 | Oh et al. |
| 6,529,500 B1 | 3/2003 | Pandharipande |
| 6,529,722 B1 | 3/2003 | Heinrich |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Tekeda |
| 6,542,734 B1 | 4/2003 | Abrol et al. |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,461 B1 | 5/2003 | Fomukong |
| 6,560,534 B2 | 5/2003 | Abraham et al. |
| 6,564,261 B1 | 5/2003 | Gudjonsson |
| 6,570,530 B2 | 5/2003 | Gaal et al. |
| 6,571,095 B1 | 5/2003 | Koodli |
| 6,574,558 B2 | 6/2003 | Kohli |
| 6,580,390 B1 | 6/2003 | Hay |
| 6,584,307 B1 | 6/2003 | Antonucci |
| 6,584,552 B1 | 6/2003 | Kuno |
| 6,587,691 B1 | 7/2003 | Granstam |
| 6,594,500 B2 | 7/2003 | Bender et al. |
| 6,597,311 B2 | 7/2003 | Sheynblat et al. |
| 6,600,927 B2 * | 7/2003 | Hamilton et al. .......... 455/456.6 |
| 6,603,973 B1 | 8/2003 | Foladare |
| 6,606,495 B1 | 8/2003 | Korpi et al. |
| 6,606,554 B2 | 8/2003 | Edge |
| 6,609,004 B1 | 8/2003 | Morse et al. |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart et al. |
| 6,621,810 B1 | 9/2003 | Leung |
| 6,628,233 B2 | 9/2003 | Knockeart et al. |

(56) References Cited

U.S. PATENT DOCUMENTS

| | | |
|---|---|---|
| 6,630,093 B1 | 10/2003 | Jones |
| 6,633,255 B2 | 10/2003 | Krasner |
| 6,640,184 B1 | 10/2003 | Rabe |
| 6,650,288 B1 | 11/2003 | Pitt |
| 6,650,901 B1 | 11/2003 | Schuster |
| 6,661,372 B1 | 12/2003 | Girerd et al. |
| 6,665,539 B2 | 12/2003 | Sih et al. |
| 6,665,541 B1 | 12/2003 | Krasner et al. |
| 6,671,620 B1 | 12/2003 | Garin et al. |
| 6,677,894 B2 | 1/2004 | Sheynblat et al. |
| 6,678,357 B2 | 1/2004 | Stumer |
| 6,680,694 B1 | 1/2004 | Knockeart et al. |
| 6,680,695 B2 | 1/2004 | Turetzky et al. |
| 6,687,504 B1 | 2/2004 | Raith |
| 6,694,258 B2 | 2/2004 | Johnson et al. |
| 6,697,629 B1 | 2/2004 | Grilli et al. |
| 6,701,144 B2 | 3/2004 | Kirbas et al. |
| 6,703,971 B2 | 3/2004 | Pande et al. |
| 6,703,972 B2 | 3/2004 | van Diggelmen |
| 6,704,651 B2 | 3/2004 | van Diggelmen |
| 6,707,421 B1 | 3/2004 | Drury et al. |
| 6,714,793 B1 | 3/2004 | Carey et al. |
| 6,718,174 B2 | 4/2004 | Vayanos |
| 6,720,915 B2 | 4/2004 | Sheynblat |
| 6,721,578 B2 | 4/2004 | Minear et al. |
| 6,721,871 B2 | 4/2004 | Piispanen |
| 6,724,342 B2 | 4/2004 | Bloebaum et al. |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | van Diggelen |
| 6,738,013 B2 | 5/2004 | Orler |
| 6,738,800 B1 | 5/2004 | Aquilon |
| 6,741,842 B2 | 5/2004 | Goldberg et al. |
| 6,744,856 B2 | 6/2004 | Karnik |
| 6,744,858 B1 | 6/2004 | Ryan |
| 6,745,038 B2 | 6/2004 | Callaway |
| 6,747,596 B2 | 6/2004 | Orler |
| 6,748,195 B1 | 6/2004 | Philips |
| 6,751,464 B1 | 6/2004 | Burg et al. |
| 6,756,938 B2 | 6/2004 | Zhao et al. |
| 6,757,266 B1 | 6/2004 | Hundscheidt |
| 6,757,544 B2 | 6/2004 | Rangarajan et al. |
| 6,757,545 B2 | 6/2004 | Nowak |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe et al. |
| 6,779,049 B2 | 8/2004 | Altman |
| 6,781,963 B2 | 8/2004 | Crockett |
| 6,788,249 B1 | 9/2004 | Farmer et al. |
| 6,795,444 B1 | 9/2004 | Vo |
| 6,795,699 B1 | 9/2004 | McCraw et al. |
| 6,799,049 B1 | 9/2004 | Zellner |
| 6,799,050 B1 | 9/2004 | Krasner |
| 6,801,159 B2 | 10/2004 | Swope et al. |
| 6,804,524 B1 | 10/2004 | Vandermeijjden |
| 6,808,534 B1 | 10/2004 | Escano |
| 6,810,323 B1 | 10/2004 | Bullock et al. |
| 6,813,264 B2 | 11/2004 | Vassilovski |
| 6,813,501 B2 | 11/2004 | Kinnunen |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong et al. |
| 6,820,069 B1 | 11/2004 | Kogan |
| 6,829,475 B1 | 12/2004 | Lee et al. |
| 6,832,373 B2 | 12/2004 | O'Neil |
| 6,839,020 B2 | 1/2005 | Geir et al. |
| 6,839,021 B2 | 1/2005 | Sheynblat et al. |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,868,074 B1 | 3/2005 | Hanson |
| 6,873,854 B2 | 3/2005 | Crockett |
| 6,876,734 B1 | 4/2005 | Summers |
| 6,882,850 B2 | 4/2005 | McConnell et al. |
| 6,885,869 B2 | 4/2005 | Raith |
| 6,885,874 B2 | 4/2005 | Grube |
| 6,885,940 B2 | 4/2005 | Brodie et al. |
| 6,888,497 B2 | 5/2005 | King et al. |
| 6,888,932 B2 | 5/2005 | Snip |
| 6,895,238 B2 | 5/2005 | Nevell et al. |
| 6,895,249 B2 | 5/2005 | Gaal |
| 6,898,633 B1 | 5/2005 | Lyndersay |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Berer et al. |
| 6,912,545 B1 | 6/2005 | Lundy |
| 6,915,208 B2 | 7/2005 | Garin et al. |
| 6,917,331 B2 | 7/2005 | Gronemeyer |
| 6,922,565 B2 | 7/2005 | Rhodes |
| 6,930,634 B2 | 8/2005 | Peng et al. |
| 6,937,187 B2 | 8/2005 | van Diggelen |
| 6,937,597 B1 | 8/2005 | Rosenberg |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,068 B2 | 10/2005 | Hutchinson |
| 6,957,073 B2 | 10/2005 | Bye |
| 6,961,019 B1 | 11/2005 | McConnell et al. |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,968,195 B2 | 11/2005 | Nowak |
| 6,970,917 B1 | 11/2005 | Kushwaha |
| 6,973,320 B2 | 12/2005 | Brown et al. |
| 6,975,266 B2 | 12/2005 | Abraham et al. |
| 6,978,453 B2 | 12/2005 | Rao |
| 6,980,816 B2 | 12/2005 | Rohles |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger et al. |
| 7,024,393 B1 | 4/2006 | Peinado |
| 7,047,411 B1 | 5/2006 | DeMello |
| 7,065,351 B2 | 6/2006 | Carter et al. |
| 7,065,507 B2 | 6/2006 | Mohammed |
| 7,072,667 B2 | 7/2006 | Olrik |
| 7,079,857 B2 | 7/2006 | Maggenti |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |

(56) References Cited

U.S. PATENT DOCUMENTS

| | | | |
|---|---|---|---|
| 7,145,900 B2 | 12/2006 | Nix | |
| 7,151,946 B2 | 12/2006 | Maggenti | |
| 7,174,153 B2 | 2/2007 | Ehlers | |
| 7,177,397 B2 | 2/2007 | McCalmont | |
| 7,177,398 B2 | 2/2007 | Meer | |
| 7,177,399 B2 | 2/2007 | Dawson | |
| 7,184,418 B1 | 2/2007 | Baba | |
| 7,200,380 B2* | 4/2007 | Havlark et al. | 455/404.2 |
| 7,209,969 B2 | 4/2007 | Lahti | |
| 7,218,940 B2 | 5/2007 | Niemenmaa | |
| 7,221,959 B2 | 5/2007 | Lindqvist | |
| 7,245,900 B1 | 7/2007 | Lamb | |
| 7,245,910 B2 | 7/2007 | Osmo | |
| 7,246,187 B1 | 7/2007 | Ezra | |
| 7,260,186 B2 | 8/2007 | Zhu | |
| 7,260,384 B2 | 8/2007 | Bales et al. | |
| 7,269,428 B1 | 9/2007 | Wallenius | |
| 7,302,582 B2 | 11/2007 | Snapp | |
| 7,321,773 B2 | 1/2008 | Hines | |
| 7,330,899 B2 | 2/2008 | Wong | |
| 7,333,480 B1 | 2/2008 | Clarke | |
| 7,369,508 B2 | 5/2008 | Parantainen | |
| 7,369,530 B2 | 5/2008 | Keagy | |
| 7,382,773 B2 | 6/2008 | Schoeneberger | |
| 7,392,240 B2 | 6/2008 | Scriffignano | |
| 7,394,896 B2 | 7/2008 | Norton | |
| 7,412,049 B1 | 8/2008 | Koch | |
| 7,424,293 B2 | 9/2008 | Zhu | |
| 7,426,380 B2 | 9/2008 | Hines | |
| 7,428,571 B2 | 9/2008 | Ichimura | |
| 7,436,785 B1 | 10/2008 | McMullen | |
| 7,440,442 B2 | 10/2008 | Grabelsky | |
| 7,450,951 B2 | 11/2008 | Vimpari | |
| 7,453,990 B2 | 11/2008 | Welenson | |
| 7,477,903 B2 | 1/2009 | Wilcock | |
| 7,495,608 B1 | 2/2009 | Chen | |
| 7,522,581 B2 | 4/2009 | Acharya | |
| 7,573,982 B2 | 8/2009 | Breen | |
| 7,602,886 B1 | 10/2009 | Beech | |
| 7,623,447 B1 | 11/2009 | Faccin | |
| 7,627,331 B2 | 12/2009 | Winrterbottom | |
| 7,702,081 B1 | 4/2010 | Klesper | |
| 7,711,094 B1 | 5/2010 | Olshansky | |
| 7,747,258 B2 | 6/2010 | Farmer | |
| 7,764,961 B2 | 7/2010 | Zhu | |
| 7,783,297 B2* | 8/2010 | Ishii | 455/456.1 |
| 7,787,611 B1 | 8/2010 | Kotelly | |
| 7,792,989 B2 | 9/2010 | Toebes | |
| 7,881,233 B2 | 2/2011 | Bieselin | |
| 7,890,122 B2 | 2/2011 | Walsh | |
| 7,895,263 B1 | 2/2011 | Kirchmeier | |
| 7,937,067 B2 | 5/2011 | Maier | |
| RE42,927 E | 11/2011 | Want | |
| 8,308,570 B2 | 11/2012 | Fiedler | |
| 2001/0011247 A1 | 8/2001 | O'Flaherty | |
| 2001/0040886 A1 | 11/2001 | Jimenez et al. | |
| 2002/0037735 A1 | 3/2002 | Maggenti | |
| 2002/0042260 A1 | 4/2002 | Saucedo | |
| 2002/0052214 A1 | 5/2002 | Maggenti | |
| 2002/0061760 A1 | 5/2002 | Maggenti | |
| 2002/0069529 A1 | 6/2002 | Wieres | |
| 2002/0077083 A1 | 6/2002 | Zellner | |
| 2002/0077084 A1 | 6/2002 | Zellner | |
| 2002/0077118 A1 | 6/2002 | Zellner | |
| 2002/0077897 A1 | 6/2002 | Zellner | |
| 2002/0085515 A1 | 7/2002 | Jaynes | |
| 2002/0085538 A1 | 7/2002 | Leung | |
| 2002/0086659 A1 | 7/2002 | Lauper | |
| 2002/0086676 A1 | 7/2002 | Hendry | |
| 2002/0098832 A1 | 7/2002 | Fleischer | |
| 2002/0102996 A1 | 8/2002 | Jenkins | |
| 2002/0102999 A1 | 8/2002 | Maggenti | |
| 2002/0111172 A1 | 8/2002 | DeWolf | |
| 2002/0112047 A1 | 8/2002 | Kushwaha | |
| 2002/0118650 A1 | 8/2002 | Jagadeesan | |
| 2002/0123327 A1 | 9/2002 | Vataja | |
| 2002/0123354 A1 | 9/2002 | Nowak | |
| 2002/0126656 A1 | 9/2002 | Park | |
| 2002/0138650 A1 | 9/2002 | Yamamoto | |
| 2002/0158777 A1 | 10/2002 | Flick | |
| 2002/0164998 A1 | 11/2002 | Younis | |
| 2002/0173317 A1 | 11/2002 | Nykanen | |
| 2002/0191595 A1 | 12/2002 | Mar | |
| 2002/0197991 A1 | 12/2002 | Anvekar et al. | |
| 2003/0009277 A1 | 1/2003 | Fan | |
| 2003/0009602 A1 | 1/2003 | Jacobs | |
| 2003/0012148 A1 | 1/2003 | Peters | |
| 2003/0013449 A1 | 1/2003 | Hose | |
| 2003/0016804 A1* | 1/2003 | Sheha et al. | 379/201.06 |
| 2003/0026245 A1 | 2/2003 | Ejzak | |
| 2003/0037163 A1 | 2/2003 | Kitada et al. | |
| 2003/0040272 A1 | 2/2003 | Lelievre | |
| 2003/0054835 A1 | 3/2003 | Gutowski et al. | |
| 2003/0065788 A1 | 4/2003 | Salomaki | |
| 2003/0072318 A1 | 4/2003 | Lam | |
| 2003/0078064 A1 | 4/2003 | Chan | |
| 2003/0078886 A1 | 4/2003 | Minear | |
| 2003/0081557 A1 | 5/2003 | Mettala | |
| 2003/0086539 A1 | 5/2003 | McCalmont | |
| 2003/0101329 A1 | 5/2003 | Lahti | |
| 2003/0101341 A1 | 5/2003 | Kettler | |
| 2003/0103484 A1 | 6/2003 | Dommen | |
| 2003/0108176 A1 | 6/2003 | Kung | |
| 2003/0109245 A1 | 6/2003 | McCalmont | |
| 2003/0114148 A1 | 6/2003 | Albertsson et al. | |
| 2003/0114157 A1 | 6/2003 | Spitz | |
| 2003/0115328 A1 | 6/2003 | Salminen | |
| 2003/0119521 A1 | 6/2003 | Tipnis et al. | |
| 2003/0119528 A1 | 6/2003 | Pew | |
| 2003/0137961 A1 | 7/2003 | Tsirtsis | |
| 2003/0153340 A1 | 8/2003 | Crockett | |
| 2003/0153341 A1 | 8/2003 | Crockett | |
| 2003/0153342 A1 | 8/2003 | Crockett | |
| 2003/0153343 A1 | 8/2003 | Crockett | |
| 2003/0161298 A1 | 8/2003 | Bergman | |
| 2003/0182053 A1 | 9/2003 | Swope et al. | |
| 2003/0186709 A1 | 10/2003 | Rhodes | |
| 2003/0196105 A1 | 10/2003 | Fineberg | |
| 2003/0201931 A1 | 10/2003 | Durst | |
| 2003/0204640 A1 | 10/2003 | Sahinoja | |
| 2003/0223381 A1 | 12/2003 | Schrodens | |
| 2004/0002326 A1 | 1/2004 | Maher | |
| 2004/0032485 A1 | 2/2004 | Stephens | |
| 2004/0041729 A1 | 3/2004 | Rowitch | |
| 2004/0043775 A1 | 3/2004 | Kennedy | |
| 2004/0044623 A1 | 3/2004 | Wake | |
| 2004/0047461 A1 | 3/2004 | Weisman | |
| 2004/0068724 A1 | 4/2004 | Gardner | |
| 2004/0076277 A1 | 4/2004 | Kuusinen | |
| 2004/0098497 A1 | 5/2004 | Banet | |
| 2004/0132465 A1 | 7/2004 | Mattila | |
| 2004/0143852 A1 | 7/2004 | Meyers | |
| 2004/0146040 A1 | 7/2004 | Phan-Anh | |
| 2004/0181689 A1 | 9/2004 | Kiyoto | |
| 2004/0184584 A1 | 9/2004 | McCalmont | |
| 2004/0185875 A1 | 9/2004 | Diacakis | |
| 2004/0190497 A1 | 9/2004 | Knox | |
| 2004/0192271 A1 | 9/2004 | Eisner | |
| 2004/0198332 A1 | 10/2004 | Lundsgaard | |
| 2004/0198375 A1 | 10/2004 | Schwengler et al. | |
| 2004/0198386 A1 | 10/2004 | Dupray | |
| 2004/0203854 A1 | 10/2004 | Nowak | |
| 2004/0204847 A1 | 10/2004 | Yanai | |
| 2004/0205151 A1 | 10/2004 | Sprigg | |
| 2004/0225878 A1 | 11/2004 | Costa-Requena | |
| 2004/0229632 A1 | 11/2004 | Flynn | |
| 2004/0242238 A1 | 12/2004 | Wang | |
| 2004/0267445 A1* | 12/2004 | De Luca et al. | 701/207 |
| 2005/0020242 A1 | 1/2005 | Holland | |
| 2005/0028034 A1 | 2/2005 | Gantman | |
| 2005/0031095 A1 | 2/2005 | Petrowicz | |
| 2005/0039178 A1 | 2/2005 | Marolia et al. | |
| 2005/0041578 A1 | 2/2005 | Huotari | |
| 2005/0043037 A1* | 2/2005 | Ioppe et al. | 455/456.1 |

(56) References Cited

U.S. PATENT DOCUMENTS

| | | |
|---|---|---|
| 2005/0043038 A1 | 2/2005 | Maanoja |
| 2005/0053209 A1 | 3/2005 | D'Evelyn |
| 2005/0071456 A1 | 3/2005 | Adda et al. |
| 2005/0078612 A1 | 4/2005 | Lang |
| 2005/0083911 A1 | 4/2005 | Grabelsky |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1 | 8/2005 | Keagy |
| 2005/0188004 A1* | 8/2005 | Bergenwall et al. .......... 709/203 |
| 2005/0190892 A1 | 9/2005 | Dawson |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0239458 A1 | 10/2005 | Hurtta |
| 2005/0255857 A1 | 11/2005 | Kim |
| 2005/0259675 A1 | 11/2005 | Tuohino et al. |
| 2005/0265318 A1 | 12/2005 | Khartabil |
| 2005/0271029 A1 | 12/2005 | Iffland |
| 2005/0282518 A1 | 12/2005 | D'Evlyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0053225 A1 | 3/2006 | Poikselka |
| 2006/0068753 A1 | 3/2006 | Karpen |
| 2006/0077911 A1 | 4/2006 | Shaffer |
| 2006/0078094 A1 | 4/2006 | Breen |
| 2006/0079330 A1 | 4/2006 | Dvorak |
| 2006/0088152 A1 | 4/2006 | Green |
| 2006/0104306 A1 | 5/2006 | Adamczkk |
| 2006/0120517 A1 | 6/2006 | Moon |
| 2006/0128395 A1* | 6/2006 | Muhonen .................... 455/456.1 |
| 2006/0135177 A1 | 6/2006 | Winterbottom |
| 2006/0154710 A1 | 7/2006 | Serafat |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0234639 A1 | 10/2006 | Kushwaha |
| 2006/0234698 A1 | 10/2006 | Fok et al. |
| 2006/0239205 A1 | 10/2006 | Warren |
| 2006/0250987 A1 | 11/2006 | White |
| 2006/0258380 A1* | 11/2006 | Liebowitz et al. ............ 455/466 |
| 2006/0293024 A1 | 12/2006 | Benco |
| 2006/0293066 A1 | 12/2006 | Edge |
| 2007/0003024 A1 | 1/2007 | Olivivier |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0041516 A1 | 2/2007 | Dickinson |
| 2007/0049288 A1* | 3/2007 | Lamprecht et al. ........ 455/456.1 |
| 2007/0054676 A1 | 3/2007 | Duan |
| 2007/0060097 A1 | 3/2007 | Edge |
| 2007/0072553 A1 | 3/2007 | Barbera |
| 2007/0081635 A1 | 4/2007 | Croak |
| 2007/0115941 A1 | 5/2007 | Patel |
| 2007/0121601 A1 | 5/2007 | Kikinis |
| 2007/0149166 A1 | 6/2007 | Turcotte |
| 2007/0149213 A1 | 6/2007 | Lamba |
| 2007/0160036 A1 | 7/2007 | Smith |
| 2007/0162228 A1 | 7/2007 | Mitchell |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0059304 A1 | 3/2008 | Kimsey |
| 2008/0063153 A1 | 3/2008 | Krivorot |
| 2008/0065775 A1 | 3/2008 | Polk |
| 2008/0080691 A1 | 4/2008 | Dolan |
| 2008/0117859 A1 | 5/2008 | Shahidi |
| 2008/0146343 A1 | 6/2008 | Sullivan et al. |
| 2008/0162637 A1 | 7/2008 | Adamczyk |
| 2008/0176582 A1 | 7/2008 | Ghai |
| 2008/0186164 A1 | 8/2008 | Emigh |
| 2008/0200182 A1 | 8/2008 | Shim |
| 2008/0214202 A1 | 9/2008 | Toomey |
| 2008/0235511 A1 | 9/2008 | O'Brien |
| 2009/0003535 A1 | 1/2009 | Grabelsky |
| 2009/0067417 A1 | 3/2009 | Kalavade |
| 2009/0097450 A1 | 4/2009 | Wallis |
| 2009/0215466 A1 | 8/2009 | Ahl et al. |
| 2009/0224931 A1 | 9/2009 | Dietz |
| 2009/0298488 A1 | 12/2009 | Snapp |
| 2009/0323636 A1 | 12/2009 | Dillon |
| 2010/0003976 A1 | 1/2010 | Zhu |
| 2010/0029244 A1 | 2/2010 | Moodbidri |
| 2010/0054220 A1 | 3/2010 | Bischinger et al. |
| 2010/0062788 A1 | 3/2010 | Nagorniak |
| 2010/0067444 A1 | 3/2010 | Faccin |
| 2010/0069034 A1 | 3/2010 | Dickinson |
| 2010/0125892 A1 | 5/2010 | Tanizawa |
| 2010/0167760 A1 | 7/2010 | Kim |
| 2010/0178973 A1 | 7/2010 | Snoddy et al. |
| 2010/0188992 A1 | 7/2010 | Raleigh |
| 2010/0198933 A1 | 8/2010 | Smith |
| 2010/0218664 A1 | 9/2010 | Toledano et al. |
| 2010/0223222 A1 | 9/2010 | Zhou et al. |
| 2011/0113060 A1 | 5/2011 | Martini |
| 2011/0131414 A1 | 6/2011 | Cheng |
| 2011/0165861 A1 | 7/2011 | Wilson |
| 2013/0012232 A1 | 1/2013 | Titus |
| 2013/0072308 A1 | 3/2013 | Peck et al. |
| 2013/0079152 A1 | 3/2013 | Hall |

FOREIGN PATENT DOCUMENTS

| | | |
|---|---|---|
| WO | WO0040038 | 7/2000 |
| WO | WO01/45342 | 6/2001 |
| WO | PCT/US01/46666 | 11/2001 |
| WO | WO02/11407 | 2/2002 |
| WO | WO02057869 | 7/2002 |
| WO | WO2004/025941 | 3/2004 |
| WO | WO2005/051033 | 6/2005 |
| WO | WO 2005051033 | 6/2005 |
| WO | WO2007027166 | 3/2007 |

OTHER PUBLICATIONS

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

International Search Report in PCT/US2007/23243 dated Apr. 2, 2008.

Yilin Ahao, Efficient and reliable date transmission for cellular and GPS based mayday systems, Nov. 1997, IEEE, IEEE Conference on Intelligent Transportation System, 1997. ITSC 97, 555-559.

(56) References Cited

OTHER PUBLICATIONS

Examiner's Office Letter in Japanese Patent Application No. 2006-542691 dated Sep. 7, 2009.
JP Laid-Open Gazette No. 2004-158947 (English abstract only).
JP Laid-Open Gazette No. 2007-507123 (counterpart English text US Patent Application Publication No. 2007/0054676).
T. Hattori, "Wireless Broadband Textbook," IDG Japan, Jun. 10, 2002, p. 142-p. 143. (no English text).
Extended European Search Report from EPO in European Appl. No. 06827172.5 dated Dec. 29, 2009.
Location Based Services V2 Roaming Support (non proprietary), 80-V8470-2NP A, dated Jan. 27, 2005, pp. 1-56.
Schulzrinne et al., Emergency Services for Internet Telephony Systems draft-schulzrinne-sipping-emergency-arch, IETF Standard Working Draft, Feb. 4, 2004, 1-22.
Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.
International Search Report received in PCT/US2011/02001 dated Apr. 27, 2012.
International Search Report received in PCT/US2011/000100 dated Apr. 24, 2012.
International Search Report received in PCT/US2011/001990 dated Apr. 24, 2012.
International Search Report received in PCT/US2012/000422 dated Dec. 10, 2012.
International Search Report received in PCT/US2012/00208 dated Jul. 6, 2012.
International Search Report received in PCT/US11/01971 dated Feb. 28, 2013.

* cited by examiner

FIG. 1

FIG. 2

LOCATION SERVICE REQUESTS THROTTLING

The present application claims priority from U.S. Provisional Application No. 60/700,345, entitled "Location Service Requests Throttling" to Zhu et al., filed Jun. 19, 2005, the entirety of which is expressly incorporated herein by reference.

BACKGROUND OF THE INVENTION

1. Field of the Invention

This invention relates generally to wireless and long distance carriers, Internet Service Providers (ISPs), and information content delivery services/providers and long distance carriers. More particularly, it relates to location services for the wireless industry.

2. Background of the Related Art

Wireless devices, and in particular cell phones, have become ubiquitous with day-to-day life. A majority of people in the United States now own cell phones.

Location services are a more recent advanced feature made available for use with wireless devices, perhaps most notably to provide location of a cell phone. The general goal of location-based services is to automatically provide location-based information to a requesting application. The requesting application may be operating on the wireless device itself, or even on an external application running, e.g., on another device in the wireless or other network. Some exemplary applications that use location services include mapping applications that show interesting places in a vicinity of the wireless device's current global position. Location based services are available for wireless devices such as personal digital assistants (PDAs) as well as for cell phones.

Cell phones and other wireless devices have become very sophisticated mini-computer devices, capable of running multiple software applications in a time-shared simultaneous manner. Popular operating systems for a wireless device include, e.g., Smartphone™ or PocketPC™, both of which permit simultaneous operation of multiple application programs on a given wireless device.

For various reasons realized by the present inventors, one or multiple location service applications may request location information of a given wireless device generally at the same time, or at least within a short period of time. The location requests may come from applications running on the wireless device itself (e.g., mapping programs), and/or from applications running on other devices within the wireless network or otherwise in communication with the wireless network, e.g., from land-based wired devices. The present inventors have appreciated that such duplicate or closely-timed location requests consume resources in the wireless network as well as the target mobile wireless device, generally causing more network traffic and slower operations of applications.

It is realized by the inventors herein that the conventional location/positioning software engine (e.g., either on a network based device or in a component in the wireless device) cannot properly handle multiple location request transactions grouped closely in time. For example, in North American emergency 9-1-1 location services, a Public Safety Answering Point (PSAP) may initiate a location request for the position information of a wireless device from which an emergency call is made in very short succession, e.g., every two seconds. However, in current satellite systems a single typical Assisted GPS (AGPS) fix takes about 15 seconds. Multiple location requests within this 15 second or so time period required for a single location fix tends to congest the software positioning engine, not to mention the network, causing most of the concurrent location requests to fail.

There is a need for better management of location requests relating to wireless devices as the number of applications that request location information grow in number, to reduce wireless network traffic and to utilize network resources more efficiently.

SUMMARY OF THE INVENTION

In accordance with the principles of the present invention, a technique for throttling location requests relating to a wireless device comprises logging a plurality of location requests within a short period of time relating to a position of the wireless device. Only one of the logged plurality of location requests is allowed through to a positioning engine relating to the wireless device. A location returned to the only one of the logged plurality of location requests is used as a location returned in remaining ones of the plurality of location requests.

DETAILED DESCRIPTION OF ILLUSTRATIVE EMBODIMENTS

The present invention provides a technique to allow a server such as a location server to throttle concurrent or closely timed location requests for the position of a given wireless device such that within a certain time period preferably only one location request will be initiated to the positioning engine and the remaining closely-timed location requests will be buffered or cached. When a position for the given wireless device is returned per the outstanding location request, then the retrieved position will be used to respond to each of the buffered location requests. Thus, a plurality of location requests are satisfied with a single request to the positioning engine.

By optimizing the use of cached position requests, throttling of location requests per the invention reduces network traffic significantly, increases the efficiency of a positioning server (therefore reducing business cost), and provides for an improved grade or quality of location based services in general.

The contents of a location request varies depending on the interface types between the location service application and the location server. However, a location request typically includes the following key elements which are important for processing the location request:

Request Quality of Position (QoP) which usually contains horizontal accuracy and response time (e.g. No Delay, Low Delay, Delay Tolerant or within a specific time).

Type of Location which indicates that the location request is for an Initial location, an Update/Last Known location, or an Update location of the target mobile. In the normal implementation of location based services, initial location is specific for the emergency location service, in which case the initial location is already stored in a cache database waiting for a query. An Update/Last Known location type request can be satisfied by using either a cached location if it is available and meet the requested QoP, or an updated location of the mobile wireless device retrieved from the network. For an update location type request, the location server retrieves the current location of the target mobile wireless device.

Optionally a cache database may not implemented in a location server. Use of a cached location for a given wireless device can reduce network traffic for Update/Last Known type location requests.

The invention introduces a method and complete procedure for throttling multiple location requests relating to the position of a same wireless device within a short period of time, e.g., within a period of time required to fulfill a single position determination. Concurrent or closely-timed location requests for the same target mobile are buffered so that at any given time there is only one ongoing positioning process for a target mobile wireless device. Other duplicated or sequential requests are buffered until the current location of the target mobile wireless device is retrieved. The retrieved position is then used to respond to all the buffered location requests.

Figure 1:
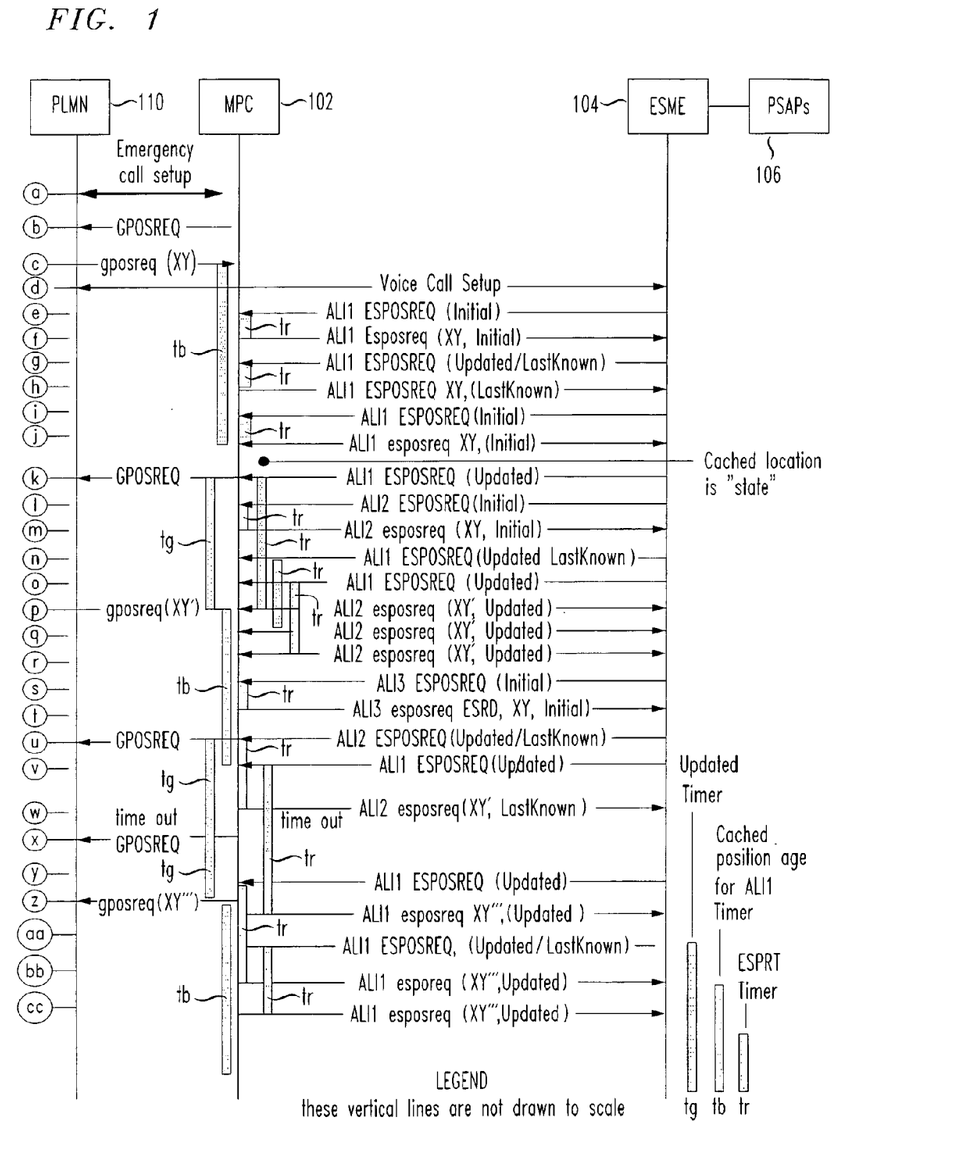
FIG. 1 shows an exemplary call flow, in accordance with an embodiment of the present invention.

FIG. 1 illustrates an example of message flow according to the invention where location request throttling in according to the invention is implemented in a mobile positioning center (MPC) 102, which is a location server in the ANSI wireless network.

In particular, as shown in FIG. 1, a location application 106 that resides in a public safety access point (PSAP)/ESME 104 initiates location requests for an emergency caller using a wireless or VoIP device to a location server MPC 102. In FIG. 1, the broad vertical bars tg, tr, tb represent running timers that can be interrupted by different events. The E2 ESPRT timer tr is a timer running in the MPC 102 for the protocol interface between the PSAP/ESM 104 and the MPC 102.

It is important to note that the call flow of FIG. 1 is an example that does not intend to present all the possible scenarios for implementing the inventive ALI-MPC location request throttling as disclosed and described herein.

In step a, an emergency call is initiated and routed by the Public Land Mobile Network (PLMN) 110 and MPC 102, to the PSAP 106 assigned to the service area where the call is initiated.

In step b, the MPC 102 initiates a GPOSREQ(initial) to the position determining equipment (PDE), to request both a coarse interim location and precise initial location information.

In step c, a position is returned in a gposreq from the PLMN 110.

In step d, the emergency call to the PSAP 106 is answered.

In step e, an automatic or manual query is sent by the ESME 104 to request the call's initial information. Conventional PSAPs can only make one type of query. The ESME 104 maintains context for E2 ESPOSREQ's REQUEST-TYPE. Since this is the first request for this call for this PSAP 106, the MPC 102 can expect at least one ESPOSREQ(initial) request will precede any Updated or Updated/LastKnown" requests. The MPC/Gateway Mobile Location Center (GMLC) starts an ESPRT timer using the ESPRT value provisioned for the ALI1 E2 interface.

In step f, the MPC 102 responds to the Initial location request with the Initial position information that is in cache.

In step g, the PSAP 106 queries the Updated/LastKnown location by sending an ESPOSREQ from ALI1.

In step h, the MPC/GMLC returns the cached position in an esposreq, as the "Stale Age" of ALI1 is set to a value bigger than 0, and the age of the cached position is less than the "Stale Age". Age is calculated from the time when the position was retrieved to the time the request arrives at MPC.

In step i, another ESPOSREQ for Initial location from ALI1 arrives.

In step j, the MPC 102 responds to the Initial request with the Initial position information that is in cache.

In step k, an ESPOSREQ for updated location from ALI1 is received. The MPC 102 initiates a network Updated Location Retrieval Procedure by sending a GPOSREQ to the PLMN 110 and starts an Updated Timer.

In step l, another ESPOSREQ for Initial location is received. This may be due to a different PSAP querying the initial location of the same emergency call.

In step m, the MPC 102 responds to the Initial request with the Initial position information that is in cache.

In step n, an ESPOSREQ for Updated/LastKnown location is received from ALI1 for the same call at the MPC 102. Since the cached position is stale already, the MPC 102 treats this request the same as an Updated Request. Therefore, as there is already an Updated Request being processed, the MPC 102 puts this request in a multiple location request Queue, starts an ESPRT for this request, and waits for the updated location.

In step o, an ESPOSREQ for an Updated location is received from the ALI1 for the same call at the MPC 102. Since there is already an Updated Request being processed, the MPC 102 puts this request in the multiple location request Queue, starts an ESPRT for this request, and waits for the updated location.

In step p, when the PDE's gposreq with XY' is received, the Updated Timer is stopped. The MPC 102 starts responding to the buffered requests using the updated position in a FIFO order, and it sends an esposreq with position XY'.

In step q, the MPC 102 responds. to the second buffered Updated Request with the same position XY'.

In step r, the MPC 102 responds to the third buffered Updated Request with the same position XY'.

In step s, another ESPOSREQ for the Initial location is received. This may be due to a different PSAP querying the initial location of the same emergency call.

In step t, the MPC 102 responds to the Initial request with the cached position XY'.

In step u, an ESPOSREQ for an Update/LastKnown location from a different ALI interface (ALI2) arrives. Although the cached location is not stale yet for other ALI interfaces (e.g. ALI1), but the "Stale Age" associated with this ALI interface is set to "0", so the MPC 102 treats the Updated/LastKnown Request the same as the Updated Request, it sends a GPOSREQ to the PLMN 110 to retrieve the updated position of the emergency caller, and starts the Updated Timer.

In step v, an ESPOSREQ for an Updated location is received from the ALI1 for the same call. Since there is already an Updated Request being processed, the MPC 102 puts this request in the multiple location request Queue, starts an ESPRT for this request, and waits for the updated location.

In step w, the ESRPT timer of the first queued Updated Request expires, the MPC 102 sends the last known position XY' via an ALI2 in an esposreq to the PSAP 106 and removes this request from the multiple location request Queue.

In step x, the Updated Timer expires, the MPC 102 retries the Updated Location Retrieval Procedure by sending another GPOSREQ, and re-starts the Updated Timer.

In step y, an ESPOSREQ for an Updated location is received from the ALI1 for the same call. Since there is already an Updated Request being processed, the MPC 102 puts this request in the multiple location request Queue, starts an ESPRT for this request, and waits for the updated location.

In step z, when the PDE's gposreq with XY' is received, the Updated Timer is stopped. The MPC 102 starts responding to the buffered requests using the updated position in a FIFO order, and it sends an esposreq with position XY".

In step aa, an ESPOSREQ for an Updated location is received from the ALI1 for the same call. The MPC 102 puts the request into the existing queue.

In step bb, the MPC 102 responds to the second buffered Updated Request with the same position XY''', and removes the request from the multiple location request Queue.

In step cc, the MPC 102 responds to the third buffered Updated Request with the same position XY''', and removes the request from the multiple location request Queue. The multiple location request Queue is cleared after the last location request is removed.

Figure 2:
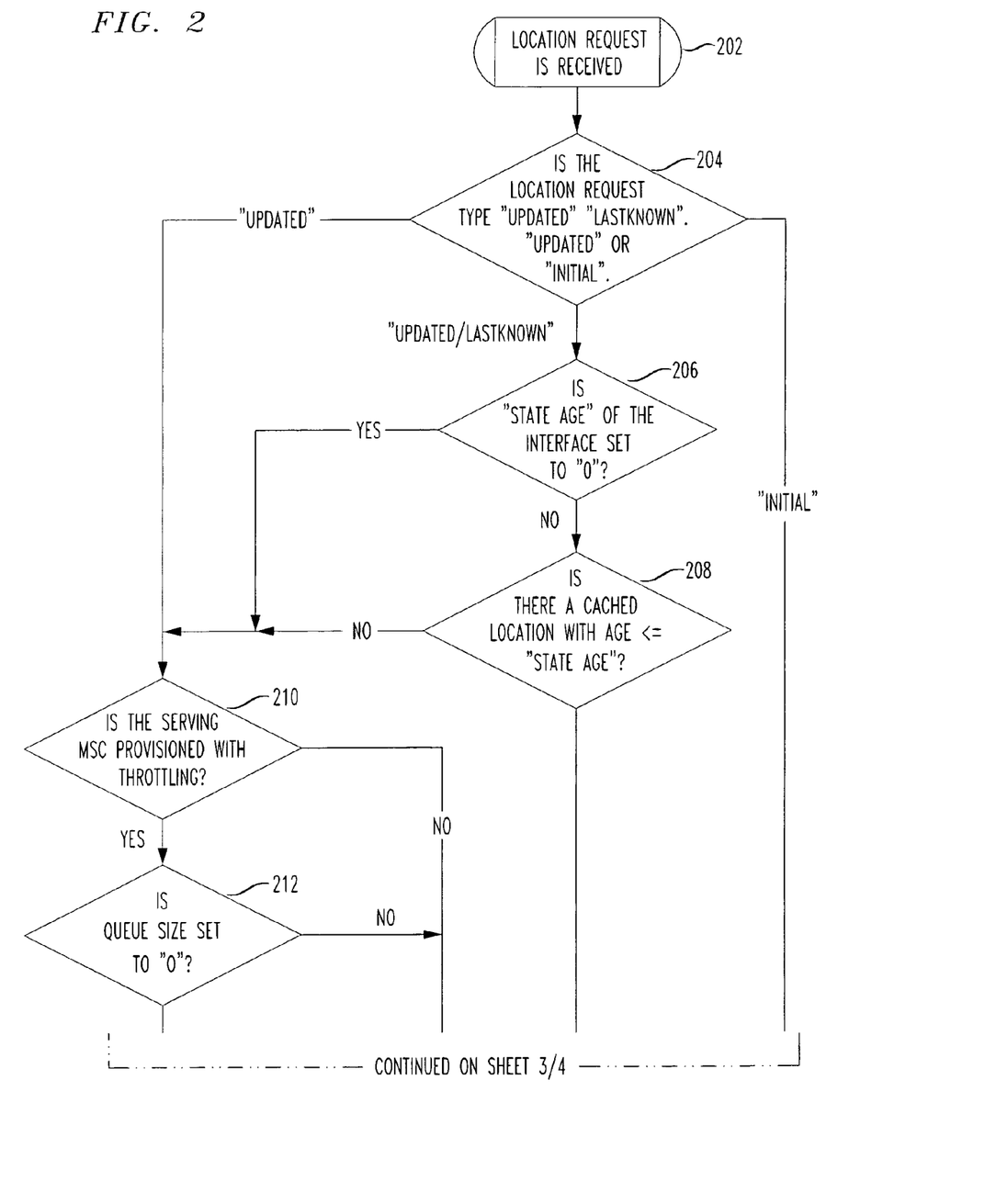
FIG. 2 shows an exemplary general procedure for processing location requests, in accordance with the principles of the present invention.

FIG. 2 shows an exemplary general procedure for processing multiple location requests received within a short period of time, e.g., within a time required to process a single location request with respect to a single wireless device, in accordance with the principles of the present invention.

Figure 3:
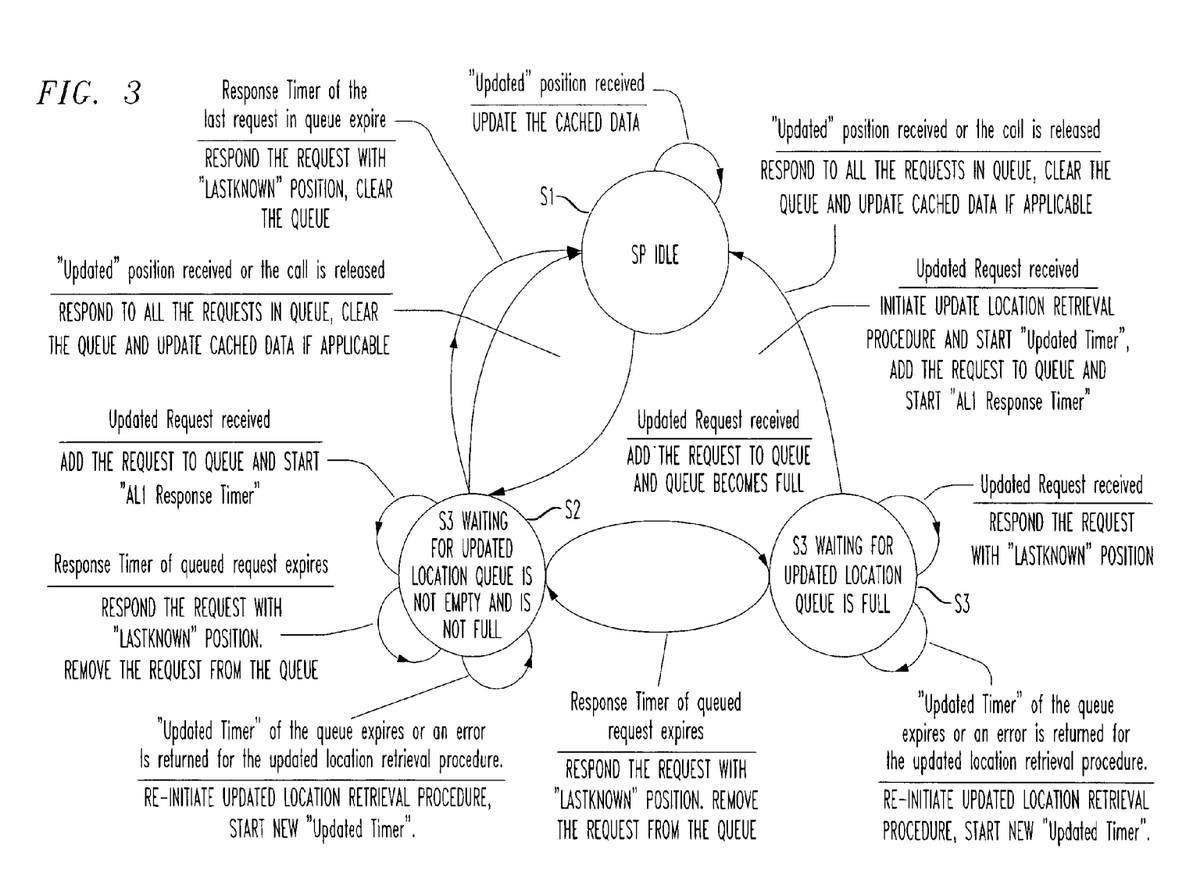
FIG. 3 shows a state diagram of update location requests, in accordance with the principles of the present invention.

In particular, FIG. 2 shows how a location server can determine whether a received location request 202 needs to trigger a network query to retrieve the current location of a target mobile wireless device, which will be handled by the throttling process illustrated in FIG. 3.

In step 204 of FIG. 2, the type of location request is determined, e.g., whether the location request type is "Updated/LastKnown", "Updated", or "Initial".

If the location request type is "Updated/LastKnown", the process continues to step 206, where it is determined if the "Stale Age" of the interface is set to '0'. If not, the process continues to step 208, where it is determined if there is a cached location with age less than or equal to the "Stale Age". If not, the process continues to step 222, where the location request is responded to with the cached location and "Last-Known" indicator, and then the process ends.

Back at step 204, if the location request type was "Initial", then the process continues to step 224, where the process moves to an appropriate existing "Initial" request handling procedure.

Back to step 204, if the location request was of the "Updated" type, the question is asked in step 210 if the serving MSC provisioned with a throttling technique as described herein. If not, the process moves to step 216, where the network updated location retrieval procedure without throttling is activated. If the result of the question asked in step 210 is yes, then the process instead moves to step 212, where it is determined if the size of the location request queue is set to '0'. If yes, the procedure moves to step 216. If not, then the procedure moves to step 214, where an updated location request throttling procedure is activated.

Following step 214 or step 216 is step 218, which determines if a new updated position information is retrieved. If not, the procedure moves to step 222. If so, the procedure moves to step 220, where a response is formatted with the newly retrieved position and "Updated" indicator, following which the procedure ends.

FIG. 3 shows a state diagram for handling update location requests in a location request throttling engine, in accordance with the principles of the present invention.

When the Location Server receives a location request, it first examines the type of location request. Different request types are treated differently. The location request throttling feature is checked to see if it is enabled. If the location request throttling feature is disabled, the location server processes the received location request normally as if no location request throttling feature were available.

The Location Server may optionally include a configurable "Stale Age". The "Stale Age" controls whether a cached position can be used for an "Update/LastKnown" location request. If the "Stale Age" is set to '0', or if there is no cached position of which the age is less than the "Stale Age", then the "Update/LastKnown" Requests will directly trigger a Network Updated Location Retrieval procedure for an Updated position similar to the procedure for "Updated" Requests. Otherwise, the cached position will be returned in response to the received "Updated/LastKnown" location as a "Last Known" location.

State Definition

S1: Idle

In the Idle State S1 of a mobile wireless device in the cache database, no resource is allocated.

The Idle State S1 does not change until the first outstanding "Updated" Location Request is received, at which time the Location Server creates a multiple location request Queue for the Updated Request, puts the received location request into the multiple location request Queue, initiates an update location retrieval procedure, and transitions to the S2 "Waiting for updated location, Queue is not empty and is not full" state.

S2: Waiting for Updated Location, Queue is not Empty and is not Full

In the S2 State, the Location Server waits for updated position information to be retrieved from the network, while the "Updated Timer" is running.

In the S2 State, several events may occur and will not trigger state transition:

Additional "Updated" location request for the same emergency caller is received, in which case the Location Server puts the "Updated" request into the multiple location request Queue while the multiple location request Queue is not full, and starts a Response Timer for this request.

Upon expiration of the Response Timer of a buffered "Updated" request, which is not the last "Updated" location request in the multiple location request Queue, the Location Server removes the location request from the multiple location request queue and indicates a "Last Known" Position for formatting a response to the original location request.

When the "Updated Timer" of the multiple location request queue expires or an error is returned from the network for an updated position retrieval procedure, if the multiple location request Queue is not empty, then the Location Server re-initiates an updated location retrieval procedure and starts a new "Updated Timer".

In the S2 State, the following events will trigger state transition from the S2 State to the S1 Idle State:

Upon expiration of the Response Timer of the last buffered "Updated" location request, the Location Server removes the location request from the multiple location request queue and indicates a "Last Known" Position for formatting a response to the original location request, and clears the multiple location request Queue.

When the updated location is retrieved, the Location Server can respond to all of the buffered "Updated" requests with the same updated location and clears the multiple location request Queue. The received location information is used to update cached data as well.

For call related location service sessions, when the call is terminated, the Location Server responds to all pending buffered requests with a "Last Known" Position, and clears the multiple location request Queue.

In the S2 State, the following event will trigger state transition from the S2 State to the S3 State:

An additional "Updated" location requests for the same emergency caller is received, in which case the Location Server puts the "Updated" location request into the multiple location request Queue, which becomes full, and starts the ALI Response Timer for this location request.

S3: Waiting for Updated Location, Queue is Full

In the S3 State, the Location Server waits for the updated position information to be retrieved from the network, while the "Updated Timer" is running and the multiple location request Queue is full.

In the S3 State, several events may occur and will not trigger state transition:

An additional "Updated" location request for the same emergency caller is received, in which case the Location Server responds to the location request right away with the "Last Known" Position.

When the "Updated Timer" of the multiple location request queue expires, or an error is returned from the network for an updated position retrieval procedure, the Location Server re-initiates an updated location retrieval procedure and starts a new "Updated Timer".

In the S3 State, the following events will trigger state transition from the S3 State to the S1 Idle State:

When the updated location is retrieved, the Location Server responds to all the buffered "Updated" location requests with the same updated location, and clears the multiple location request Queue. The received location information is used to update cached data as well.

For call related location service sessions, when the call is terminated, the Location Server responds to all buffered location requests with "Last Known" Position, and clears the multiple location request Queue.

In the S3 State, the following event will trigger state transition from the S3 State to the S2 State:

Upon expiration of the Response Timer of a buffered "Updated" location request, the Location Server removes the location request from the multiple location request queue and indicates a "Last Known" Position for formatting a response to the original location request, and clears the multiple location request Queue.

Event and Action Table

Table 1 presents details of exemplary events and corresponding actions that are preferably taken for the state machine illustrated in FIG. 3.

TABLE 1

Event and Action Table

| Event | State | Action | State Transition |
|---|---|---|---|
| An "Updated" request (the first outstanding request) is received | S1 | Location Server creates a Queue for Updated Requests, puts the received request into the Queue, initiates update location retrieval procedure and starts Updated Timer. | S1 → S2 |
|  | S2 | N/A | N/A |
|  | S3 | N/A | N/A |
| Additional "Updated" request for the same mobile wireless device is received | S1 | N/A | N/A |
|  | S2 | Location Server puts the "Updated" request into the Queue while Queue is not full, and starts a ALI Response Timer for this request | Remaining in State S2 |
|  | S3 | E911 System puts the "Updated" location request into the multiple location request Queue, which becomes full, and starts an ALI Response Timer for this location request. | S2 → S3 |
|  | S3 | Location Server responds to the location request right away with "Last Known" Position | Remaining in State S3 |
| "Updated" Timer of the multiple location request queue expires | S1 | N/A | N/A |
|  | S2 | Location Server re-initiates an updated location retrieval procedure and starts a new "Updated Timer". | Remaining in State S2 |
|  | S3 | Location Server re-initiates an updated location retrieval procedure and starts a new "Updated Timer". | Remaining in State S3 |
| Expiration of Response Timer of a buffered "Updated" location request, which is not the last "Updated" request in the multiple location request Queue | S1 | N/A | N/A |
|  | S2 | Location Server removes the location request from the multiple location request queue and indicates a "Last Known" Position for formatting a response to the original location request | Remaining in State S2 |
|  | S3 | Location Server removes the location request from the multiple location request queue and indicates a "Last Known" Position for formatting a response to the original location request | S3 → S2 |
| Expiration of Response Timer of the last buffered "Updated" location request | S1 | N/A | N/A |
|  | S2 | Location Server removes the location request from the multiple location request queue and indicates "Last Known" Position for formatting a response to the original location request, and clears the multiple location request Queue | S2 → S1 |
|  | S3 | N/A | N/A |
| The updated location request is retrieved | S1 | Location Server updates the cached data. | Remaining in State S1 |
|  | S2 | Location Server responds to all the buffered "Updated" location requests with the same updated location and clears the multiple location request Queue, and updates the cached data. | S2 → S1 |
|  | S3 | Location Server responds to all the buffered "Updated" requests with the same updated location and clear the Queue, update the cached data. | S3 → S1 |
| For call related location service sessions, when the call is terminated | S1 | N/A | N/A |
|  | S2 | Location Server responds to the all the buffered requests with "Last Known" Position, and clear the Queue | S2 → S1 |
|  | S3 | Location Server responds to all the still-pending buffered location requests with a "Last Known" Position, and clear the multiple location request Queue | S3 → S1 |
| An error is returned from the Updated Position Retrieval Procedure | S1 | Ignore | Remaining in State S1 |
|  | S2 | Location Server re-initiates an updated location retrieval procedure, and starts a new "Updated Timer". | Remaining in State S2 |

TABLE 1-continued

Event and Action Table

| Event | State | Action | State Transition |
|---|---|---|---|
| | S3 | Location Server re-initiates an updated location retrieval procedure, and starts a new "Updated Timer". | Remaining in State S3 |

While the invention has been described with reference to the exemplary embodiments thereof, those skilled in the art will be able to make various modifications to the described embodiments of the invention without departing from the true spirit and scope of the invention.

What is claimed is:

1. A technique for throttling location requests relating to a wireless device, comprising:
  logging, at a single location server, a plurality of location requests associated with a single wireless device within a period of time prior to issuing a single location request to a positioning engine;
  determining if said logged plurality of location requests include at least one request for a last known location of said single wireless device, said at least one request for said last known location being distinct from a request for a current location of said single wireless device; and
  in response to said determination that said logged plurality of location requests include said at least one request for a last known location, transmitting previously cached location information of said single wireless device.

2. The technique for throttling location requests according to claim 1, wherein:
  said single wireless device is a Voice over Internet Protocol (VoIP) device.

3. The technique for throttling location requests according to claim 1, wherein:
  said period of time is about 15 seconds.

4. Apparatus for throttling location requests relating to a wireless device, comprising:
  means for logging, at a single location server, a plurality of location requests associated with a single wireless device within a period of time prior to issuing a single location request to a positioning engine;
  means for determining if said logged plurality of location requests include at least one request for a last known location of said single wireless device, said at least one request for said last known location being distinct from a request for a current location of said single wireless device; and
  means for transmitting previously cached location information of said single wireless device in response to said determination that said logged plurality of location requests include said at least one request for a last known location.

5. The apparatus for throttling location requests according to claim 4, wherein:
  said wireless device is a Voice over Internet Protocol (VoIP) device.

6. The apparatus for throttling location requests according to claim 4, wherein:
  said period of time is less than about 15 seconds.

7. The apparatus for throttling location requests according to claim 4, wherein:
  said period of time is about 15 seconds.

8. Apparatus for throttling location requests relating to a wireless device, comprising:
  a logger to log, at a single location server, a plurality of location requests associated with a single wireless device within a period of time prior to issuing a single location request to a positioning engine;
  a module to determining if said logged plurality of location requests include at least one request for a last known location of said single wireless device, said at least one request for said last known location being distinct from a request for a current location of said single wireless device; and
  a transmitter to transmit previously cached location information of said single wireless device in response to said determination that said logged plurality of location requests include said at least one request for a last known location.

9. The apparatus for throttling location requests according to claim 8, wherein:
  said single wireless device is a Voice over Internet Protocol (VoIP) device.

10. The apparatus for throttling location requests according to claim 8, wherein:
  said period of time is less than about 15 seconds.

11. The apparatus for throttling location requests according to claim 8, wherein:
  said period of time is about 15 seconds.

* * * * *